(12) United States Patent
Nguyen

(10) Patent No.: US 8,432,641 B1
(45) Date of Patent: Apr. 30, 2013

(54) DISK DRIVE WITH MULTI-ZONE ARM DAMPER

(75) Inventor: Tu Nguyen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 283 days.

(21) Appl. No.: 12/825,392

(22) Filed: Jun. 29, 2010

(51) Int. Cl.
*G11B 5/55* (2006.01)
(52) U.S. Cl.
USPC .................................. 360/265.9; 360/97.19
(58) Field of Classification Search .............. 360/97.19, 360/265.7, 265.9, 266
See application file for complete search history.

(56) References Cited

U.S. PATENT DOCUMENTS

| | | | |
|---|---|---|---|
| 3,713,121 A | 1/1973 | Fasano | |
| 5,801,905 A | 9/1998 | Schirle | |
| 5,936,808 A | 8/1999 | Huang | |
| 6,091,574 A | 7/2000 | Misso | |
| 6,212,043 B1 * | 4/2001 | Nakamura et al. | 360/244.3 |
| 6,215,623 B1 * | 4/2001 | Zhu | 360/244.3 |
| 6,245,265 B1 | 6/2001 | Chung | |
| 6,310,746 B1 | 10/2001 | Hawwa | |
| 6,310,749 B1 | 10/2001 | Beatty | |
| 6,392,845 B1 | 5/2002 | Tsuda | |
| 6,498,704 B1 | 12/2002 | Chessman | |
| 6,512,658 B1 | 1/2003 | Jierapipatanakul | |
| 6,563,676 B1 | 5/2003 | Chew | |
| 6,678,121 B2 | 1/2004 | Lee | |
| 6,697,225 B2 | 2/2004 | Wittig | |
| 6,731,466 B2 * | 5/2004 | Arya | 360/244.3 |
| 6,744,597 B2 | 6/2004 | Nguyen | |
| 6,775,104 B2 | 8/2004 | Hong | |
| 6,879,466 B1 | 4/2005 | Oveyssi | |
| 6,937,444 B1 | 8/2005 | Oveyssi | |
| 6,947,260 B2 | 9/2005 | Dominguez | |
| 6,961,219 B2 * | 11/2005 | Asano et al. | 360/266 |
| 6,970,327 B2 | 11/2005 | MacLeod | |
| 6,982,852 B2 | 1/2006 | Nagahiro | |
| 7,082,014 B2 | 7/2006 | Kim | |
| 7,105,601 B2 * | 9/2006 | Guo et al. | 525/132 |
| 7,224,554 B2 * | 5/2007 | Wright | 360/244.3 |
| 7,352,537 B2 | 4/2008 | Dominguez | |
| 7,489,480 B2 | 2/2009 | Gong | |
| 7,545,607 B2 * | 6/2009 | Shimizu et al. | 360/265.7 |
| 7,551,400 B2 * | 6/2009 | Renken et al. | 360/244.9 |
| 7,697,240 B2 * | 4/2010 | Funabashi et al. | 360/265.9 |
| 8,097,194 B2 * | 1/2012 | Boss | 264/140 |
| 2002/0141114 A1 * | 10/2002 | Wittig et al. | 360/244.9 |
| 2003/0169537 A1 | 9/2003 | Weichelt | |
| 2005/0152070 A1 | 7/2005 | Funabashi | |
| 2006/0221505 A1 | 10/2006 | Fujimoto | |
| 2008/0037178 A1 | 2/2008 | Nguyen | |
| 2008/0151433 A1 | 6/2008 | Soga | |
| 2008/0226949 A1 | 9/2008 | Hanrahan | |
| 2008/0310054 A1 | 12/2008 | Fu | |
| 2009/0002894 A1 | 1/2009 | Kerner | |
| 2009/0059435 A1 | 3/2009 | Huang | |

* cited by examiner

*Primary Examiner* — Angel A. Castro

(57) ABSTRACT

Described herein is a disk drive having a head stack assembly with an actuator arm that is rotatable about an axis of rotation and has a damping layer disposed on the actuator arm. The damping layer has first and second damping portions, which can include an adhesive or viscoelastic layer. The first damping portion has different damping properties than the second damping portion.

25 Claims, 5 Drawing Sheets

DISK DRIVE WITH MULTI-ZONE ARM DAMPER

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
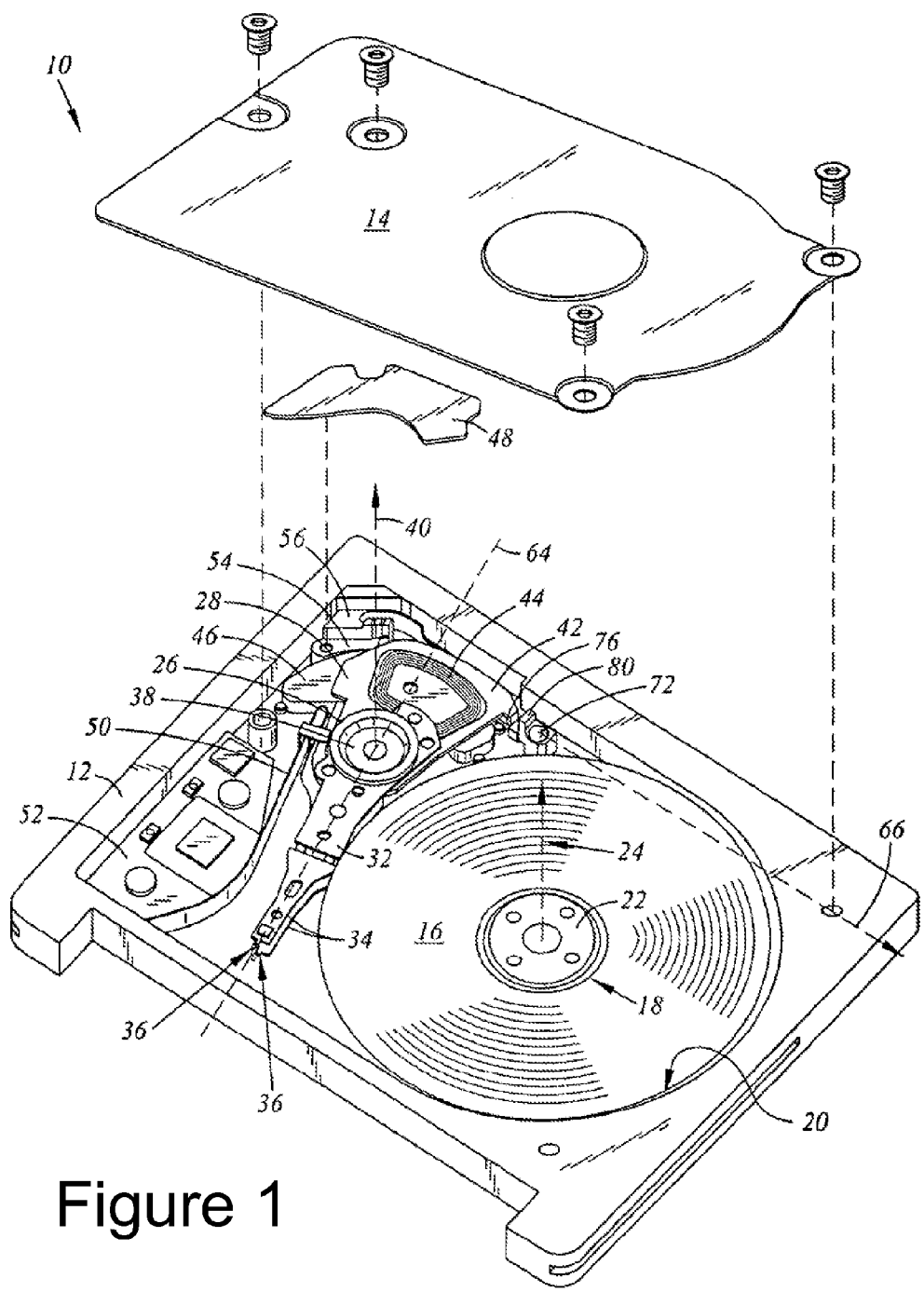
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity on the actuator arm 32 can adversely affect the performance of the HDD. For example, vibration of the actuator 28 can result in variations in the spacing between the head element and media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Some HDD assemblies include one or more constrained layer dampers that operate to reduce adverse effects of vibrations during operation of the HDD. The constrained layer damper can include a stiffening layer, having a substantially planar surface, and an adhesive layer that is positioned between an actuator arm surface and the stiffening layer. The adhesive layer can include a viscoelastic material, which can be disposed upon a surface of the actuator arm between the actuator arm surface and a stiffener layer, and which operates, among other things, to secure the stiffening layer to the actuator arm. The stiffener layer may be formed of a non-magnetic metal or other substantially stiff material. Non-magnetic metals may include stainless steel, such as 300 series stainless steel, and/or aluminum.

The adhesive layer, also referred to herein as a viscoelastic layer, may be formed of a viscoelastic polymer. The viscoelastic layer may be adhesive in nature and may additionally function to maintain the constrained layer damper in position against the actuator. The constrained layer damper may be manufactured from sheets of material which may undergo a stamping process. As mentioned above, the constrained layer damper serves to mitigate resonant vibration of the actuator arms and the coil support.

The constrained layer damper, mounted on the actuator arms, works by dissipating the strain energy in the vibration modes of interest (e.g., arm torsion, arm sway, arm bending) into heat in the damping polymer of the viscoelastic layer. The stainless steel substrate (e.g., SUS3O4), or other stiffening materials provided herein, acts as a constraining layer for the visco-elastic damping polymer (bonded to the substrate) which undergoes shear deformation when the arms are vibrating in their natural modes. The effectiveness of damping depends on the degree of shear induced in the damping polymer by the specific vibration mode (function of mode shape), the thicknesses, elastic storage & loss moduli of the constraining layer and damping polymer and the frequency of the mode and the operating temperature of the HDD.

Described herein are methods and apparatus for utilizing constrained layer dampers to improve actuator dynamics in a hard disk drive. Arm dampers are also an effective measure to reduce carriage to carriage variability of arm-sway and arm-torsion mode gains and frequencies. The dampers also help reduce random transient vibration (RTV) and nonrepeatable run-out (NRRO) associated with arm modes (arm sway, arm torsion, arm bending).

Figure 2:
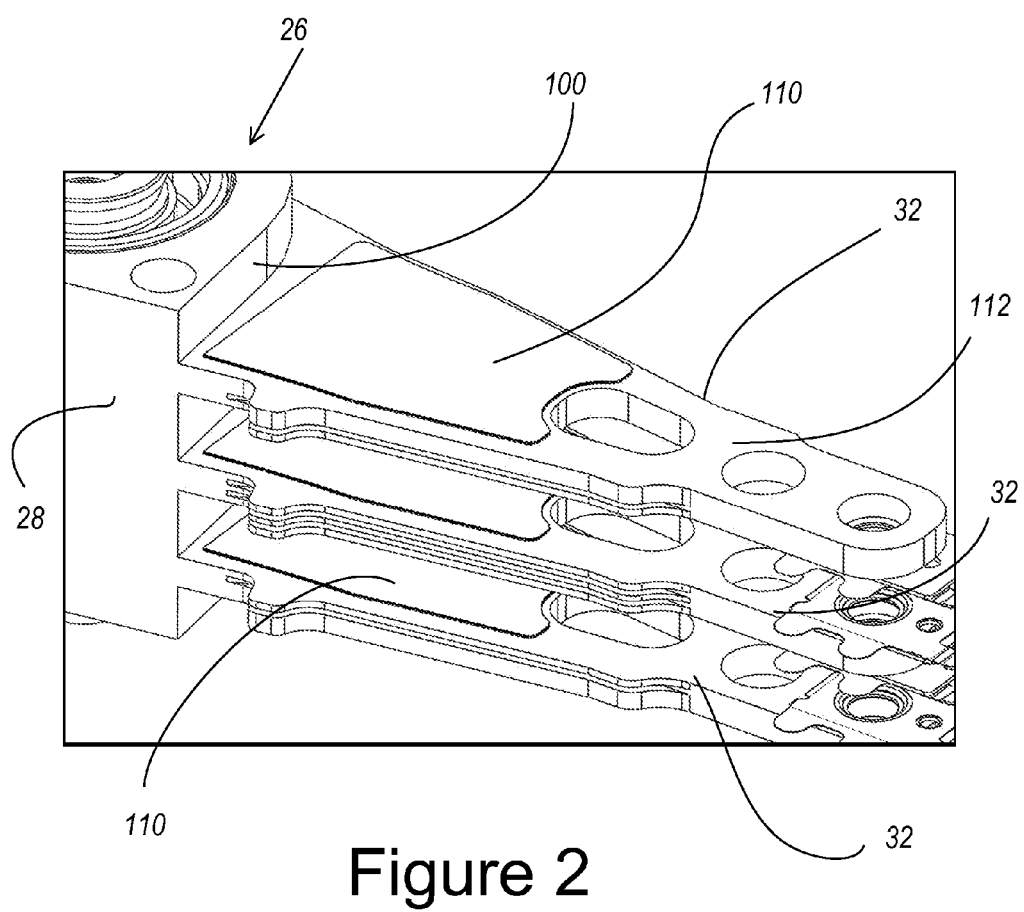
FIG. 2 depicts a head stack assembly with a plurality of actuator arms in accordance with one embodiment.

FIG. 2 depicts a head stack assembly 26 including an actuator 28 and a plurality of actuator arms 32 that extend from an actuator based 100. As depicted in FIG. 2, in one embodiment, a plurality of actuator arms 32 include a damper 110 on a top surface 112 of the respective actuator arm 32. In one embodiment, the damper 110 extends from a position on the top surface 112 of the respective actuator arm adjacent the actuator based 100 and extending along a portion of the length of the top surface 112.

Figure 3:
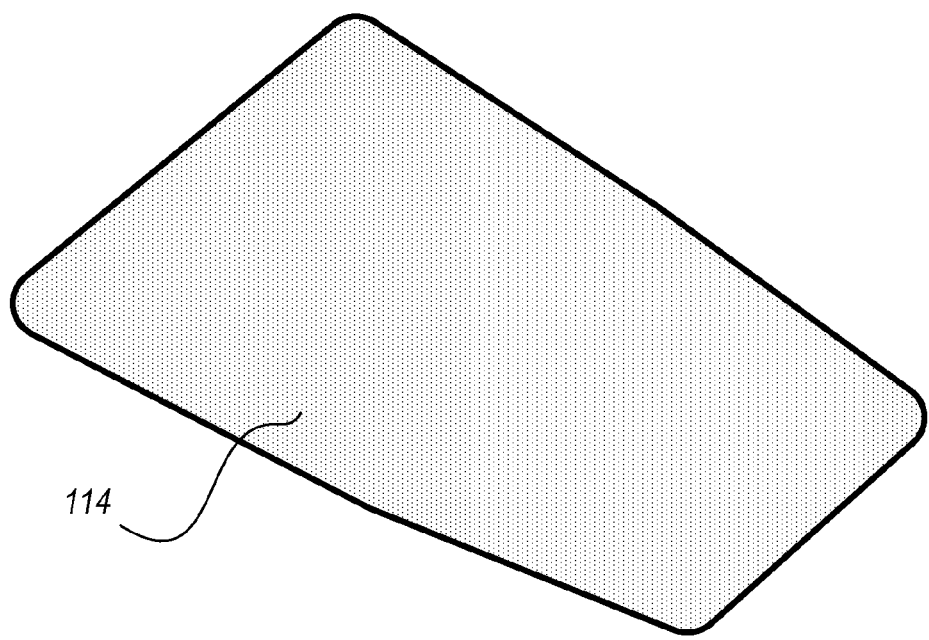
FIG. 3 depicts a viscoelastic layer of a damper.

FIG. 3 depicts a viscoelastic layer 114 that is used with a constrained layer damping system, in which the constrained layer damper includes one uniform viscoelastic material. Utilizing one uniform constrained layer damper provides limited arm damping effects especially at high operating temperatures on the arm sheer modes. The damper is less efficient off from optimized high temperatures because the viscoelastic material is optimized to work in the low range of the operating temperature. The damper is less efficient on the arm sheer modes because the constrained layer floats and moves along with the deformation of the arm.

In accordance with one embodiment, the constrained layer damper can include a stiffening layer and ended he said of the layer with two zones of different types of viscoelastic material, positioned between the top surface 112 of the actuator arm 32 and the constrained layer surface. Such a construction provides that the armed damper design is enhanced by introducing two zones of viscoelastic material to significantly reduce the impact of arm sheer modes of vibration and to extend the damping efficiency to, for example, cover a higher operating temperature range.

In one embodiment, one zone of viscoelastic material is optimized for low temperature operation, and one zone of viscoelastic material is optimized for high temperature operation. For example, the high temperature of viscoelastic material can be positioned closer to the root of the actuator arm. The high temperature viscoelastic material can be optimized for high temperature ranges. At low operating temperatures, the high temperature viscoelastic material provides a stronger constraint to the armed damper 110. The deformation of the arm 32 during different modes of vibration creates relative motion between the constrained layer 110 and the arms 32.

At low temperatures, the high temperature viscoelastic material provides a strong constraint by creating a higher relative displacement between the constrained layer 110 and the arm 32 during arm resonances. The resulting high shear deformation in the viscoelastic layer provides greater strain energy and increased damping energy dissipation. At high temperatures, because the high temperature zone of the viscoelastic material is optimized for high temperature, it provides an efficient damping benefit to suppress arm resonances.

Figure 4:
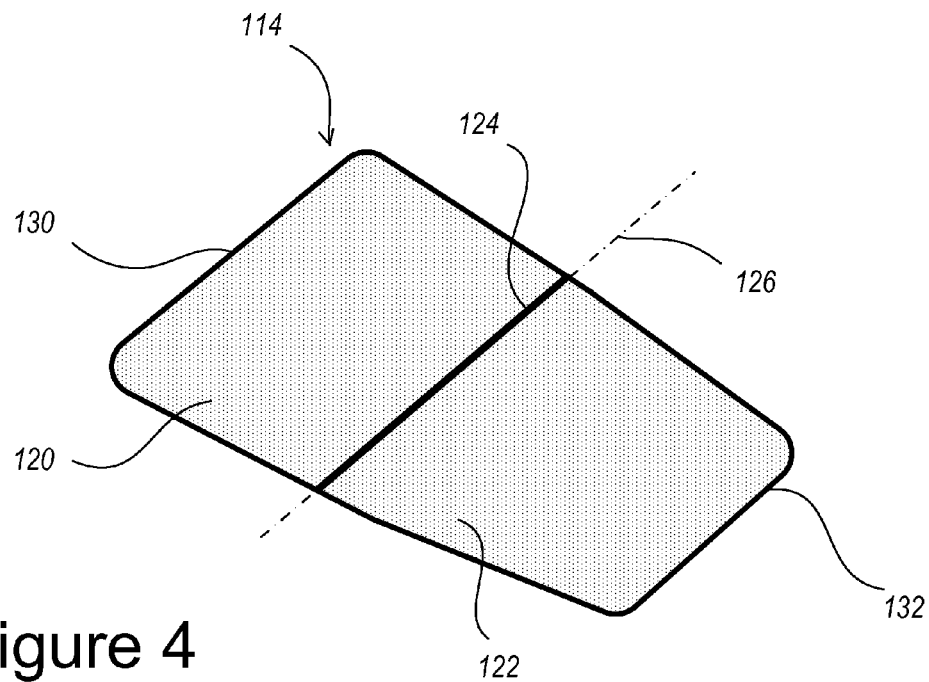
FIG. 4 depicts a viscoelastic layer of a damper in accordance with one embodiment.

FIG. 4 depicts an embodiment of a viscoelastic layer having multiple zones of viscoelastic material that each have different damping properties. In the embodiment depicted in FIG. 4, the viscoelastic layer 114 and includes a first portion 120 and a second portion 122 separated by a border 124. The border 124 can extend along a short axis 126 of the actuator arms 32 or of the viscoelastic layer 114. In some embodiments, the short axis 126 is transverse to the longitudinal axis 64 (FIG. 1) of the actuator arm 32.

As explained above, in one embodiment, the first portion 120 of the viscoelastic layer 114 can include a high temperature viscoelastic material, and the second portion 122 of the viscoelastic layer 114 can include a relatively lower temperature viscoelastic material. In one embodiment, the high temperature viscoelastic material performs its damping functions to a greater degree at higher temperature range than that of the lower temperature viscoelastic material. In one embodiment, the first portion 120 is positioned closer to the actuator 28 than is the second portion 122.

Although FIG. 4 depicts the border 124 as extending along a substantially straight line, it is contemplated that the border 124 can extend in a curved fashion, an irregular fashion, or an angulated fashion relative to the short axis 126. Additionally, although FIG. 4 depicts the border 124 as being located substantially equidistant from a base end 130 of the viscoelastic layer 114 and an outer end 132, the border 124 can be positioned at a location closer to at least one of the base end 130 and the outer end 132.

Figure 5:
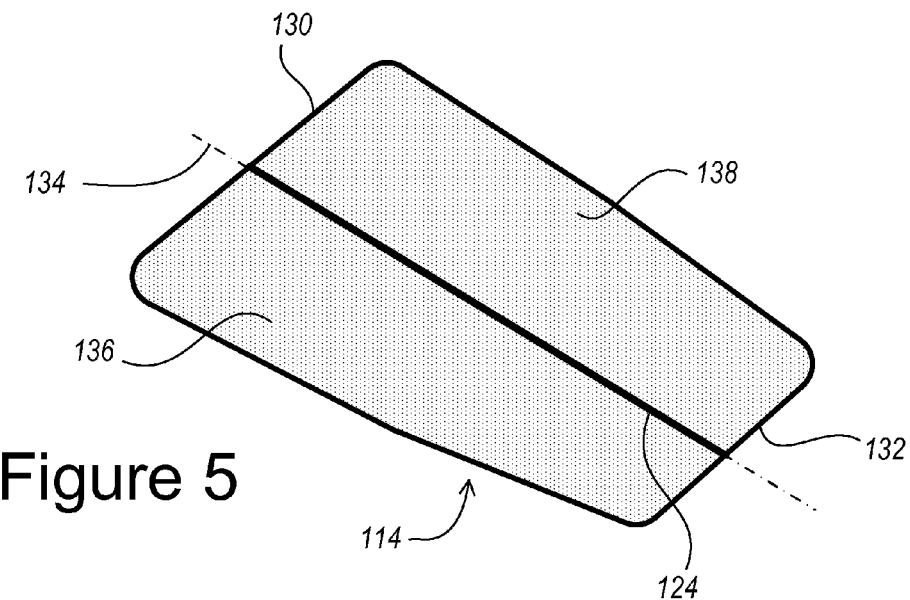
FIG. 5 depicts a viscoelastic layer of a damper in accordance with one embodiment.

FIG. 5 depicts an embodiment of the viscoelastic layer 114 having a first portion 136 separated from a second portion 138 by a border 124 that extends along a long axis 134 of the viscoelastic layer 114. In some embodiments, the long axis 134 is aligned with, parallel to, or contiguous with the longitudinal axis 64 of the actuator arm 32. In some embodiments, the first portion 136 includes different damping properties than the second portion 138. In one embodiment, the first portion 136 extends from the base end 130 to the outer end 132. In one embodiment, the second portion 138 extends from the base end 130 to the outer end 132.

Figure 6:
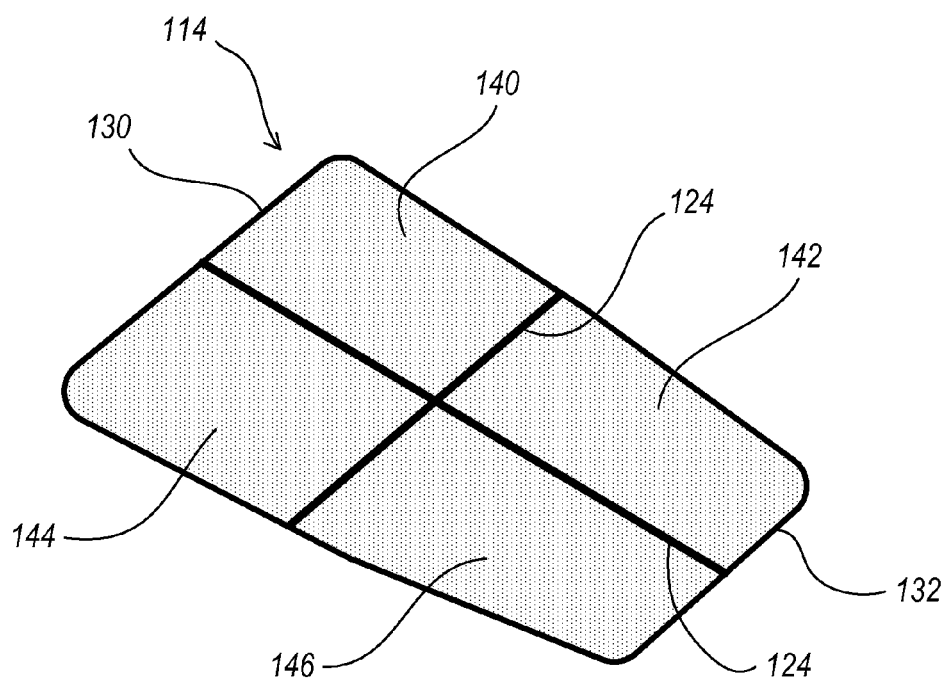
FIG. 6 depicts a viscoelastic layer of a damper in accordance with one embodiment.

In one embodiment, as shown in FIG. 6, the viscoelastic layer 114 can include more than two portions with different damping properties. For example, in FIG. 6, a viscoelastic layer 114 is shown having a first portion 140, a second portion 142, a third portion 144, and a fourth portion 146. In one embodiment, each of the portions depicted in FIG. 6 have different damping properties than other portions of the viscoelastic layer 114. In the embodiment depicted in FIG. 6, borders 124 separate the portions of the viscoelastic layer 114 into four quadrants. Although the embodiment depicted in FIG. 6 illustrates the borders 124 and separating each of the four portions into substantially equal portions, it is contemplated that the borders may be angulated with respect to each other and form irregularly shaped or unequally shaped portions of the viscoelastic layer 114.

In one embodiment, the disk drive includes a disk having a recording surface and an actuator rotatable about an axis of rotation. The actuator includes an actuator arm extending from the axis of rotation and is configured to rotate over the disk recording surface. The drive also includes a damping layer disposed on the actuator arm. The damping layer can have first and second damping portions, and the first damping portion can have first temperature-dependent damping properties. The second damping portion preferably has second temperature-dependent damping properties, which are different from the first temperature-dependent damping properties.

In one embodiment, the first damping portion has a higher optimal operating temperature range than the second damping portion. For example, in one embodiment, the first damping portion has an optimal operating temperature range between about 0° C. and about 70° C. In some embodiments, the range can be between about 40° C. and about 70° C., and in some embodiments, the range can be between about 0° C. and about 40° C. In some embodiments, the optimal operating temperature range can be greater or less than about 70° C.

In one embodiment, the second damping portion has a lower optimal operating temperature range than the first damping portion. For example, in one embodiment, the second damping portion has an optimal operating temperature range between about 0° C. and about 40° C. In some embodiments, the second damping portion can have a higher optimal operating temperature range than the first damping portion. For example, in one embodiment, the second damping portion has an optimal operating temperature range between about 0° C. and about 70° C. In some embodiments, the second damping portion has an optimal operating temperature range between about 40° C. and about 70° C.

The first damping portion can be disposed on the actuator arm 32 adjacent, or relatively near, the axis of rotation 40 of the actuator 28. For example, the first damping portion can be disposed on the actuator arm 32 closer to the axis of rotation 40 than the second damping portion. The first damping portion preferably provides different damping effects than the second damping portion and preferably extends along a top surface of the actuator arm 32. The first and second damping portions are, in one embodiment, separated by a long axis of the actuator arm 32.

In one embodiments, the damper 110 includes a third damping portion having damping properties different than the first and second damping portions. In some embodiments, the damper 110 includes at least three damping portions, each having different damping properties than other portions of the damper 110. In some embodiments, the different damping properties are temperature dependent. The third damping portion can be separated from at least one of the first and second damping portions by at least one of a long axis of the actuator arm or a short axis of the actuator arm.

In one embodiment, a head stack assembly 26 for a disk drive 10 is provided having an actuator arm 32 configured to be rotatable about an axis of rotation 40 and a damping layer 110, or damper, disposed on the actuator arm 32. In one embodiment, the damping layer 110 includes first and second damping portions. The first damping portion preferably has different damping properties than the second damping portion. Some embodiments provide that the damping layer 110 can be positioned on multiple actuator arms 32 of the head stack assembly 26.

In one embodiment, the first damping portion is preferably positioned at a different radial distance from the axis of rotation 40 than the second damping portion. In some embodiments, the damping properties of the first damping portion is temperature dependent, and in one embodiment, the first damping portion has a higher optimal operating temperature range than the second damping portion.

A method for damping actuator arm vibrations of a disk drive 10 can include the steps of providing a head stack assembly 26 having an actuator arm 32 rotatable about an axis of rotation 40 and disposing on the actuator arm 32 a damper layer 110 having first and second damping portions. The first damping portion preferably has different damping properties than the second damping portion. In one embodiment, the first damping portion is disposed closer to the axis of rotation 40 than the second damping portion. In one embodiment, the disposing includes disposing a first damping portion having a lower optimal damping temperature range farther from the axis of rotation than a second damping portion having a higher optimal damping temperature range.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
    a disk having a recording surface;
    an actuator rotatable about an axis of rotation, the actuator comprising an actuator arm extending from the axis of rotation and configured to rotate over the disk recording surface; and
    an adhesive layer disposed on the actuator arm, the adhesive layer comprising first and second damping portions, wherein the first damping portion comprises first temperature-dependent damping properties, and the second damping portion comprises second temperature-dependent damping properties, different from the first temperature-dependent damping properties.

2. The disk drive of claim 1, wherein the first damping portion has a higher optimal operating temperature range than the second damping portion.

3. The disk drive of claim 2, wherein the first damping portion is disposed on the actuator arm adjacent the axis of rotation.

4. The disk drive of claim 2, wherein the first damping portion is disposed on the actuator arm closer to the axis of rotation than the second damping portion.

5. The disk drive of claim 1, wherein the first damping portion has an optimal operating temperature range between about 0° C. and about 70° C.

6. The disk drive of claim 5, wherein the second damping portion has an optimal operating temperature range between about 40° C. and about 70° C.

7. The disk drive of claim 1, wherein the first damping portion provides different damping effects than the second damping portion.

8. The disk drive of claim 1, wherein the adhesive layer extends along a top surface of the actuator arm.

9. The disk drive of claim 1, wherein the first damping portion comprises a visco-elastic material.

10. The disk drive of claim 1, wherein the first and second damping portions are separated by a long axis of the actuator arm.

11. The disk drive of claim 1, further comprising a third damping portion having damping properties different than the first and second damping portions.

12. The disk drive of claim 11, wherein the third damping portion is separated from at least one of the first and second damping portions by at least one of a long axis of the actuator arm or a short axis of the actuator arm.

13. A head stack assembly for a disk drive, the head stack assembly comprising:
    an actuator arm configured to be rotatable about an axis of rotation; and
    an adhesive layer disposed on the actuator arm, the adhesive layer comprising first and second damping portions, wherein the first damping portion comprises different material-dependent damping properties than the second damping portion, and wherein the first damping portion is positioned at a different radial distance from the axis of rotation than the second damping portion.

14. The head stack assembly of claim 13, wherein the first damping portion has a higher optimal operating temperature range than the second damping portion.

15. The disk drive of claim 14, wherein the first damping portion is disposed on the actuator arm closer to the axis of rotation than the second damping portion.

16. The disk drive of claim 13, wherein the first damping portion has an optimal operating temperature range between about 0° C. and about 70° C.

17. The disk drive of claim 16, wherein the second damping portion has an optimal operating temperature range between about 40° C. and about 70° C.

18. The disk drive of claim 13, wherein the first damping portion provides different damping effects than the second damping portion.

19. The disk drive of claim 13, wherein the different material-dependent damping properties of the first damping portion and the second damping portion are temperature-dependent damping properties.

20. The disk drive of claim 13, wherein the adhesive layer extends along a top surface of the actuator arm.

21. The disk drive of claim 13, wherein the first damping portion comprises a visco-elastic material.

22. The disk drive of claim 13, further comprising a third damping portion with material-dependent damping properties different than the first and second damping portions.

23. The disk drive of claim 22, wherein the third damping portion is separated by at least one of the first and second damping portions by a long axis of the actuator arm.

24. A method for damping actuator arm vibrations of a disk drive, the method comprising:
   providing a head stack assembly having an actuator arm rotatable about an axis of rotation; and
   disposing on the actuator arm an adhesive layer comprising first and second damping portions, wherein the first damping portion comprises different material-dependent damping properties than the second damping portion, and wherein the first damping portion is disposed closer to the axis of rotation than the second damping portion.

25. The method of claim 24, wherein the disposing comprises disposing a damping portion having a lower optimal damping temperature range farther from the axis of rotation than a damping portion having a higher optimal damping temperature range.

* * * * *